Sept. 14, 1943.    H. H. RING ET AL    2,329,298
HANDLE FOR RANGES
Filed July 29, 1940

Inventor:
Harold H. Ring

By McCanna, Wintercorn
& Morsbach
Attys.

Patented Sept. 14, 1943

2,329,298

UNITED STATES PATENT OFFICE 2,329,298

HANDLE FOR RANGES

Harold H. Ring, Rockford, Ill., assignor to Geo. D. Roper Corporation, Rockford, Ill., a corporation of Illinois Application July 29, 1940, Serial No. 348,126

6 Claims. (Cl. 16—114)

This invention relates to improvements in handles and attaching means therefor.

In the matter of handles for drawers and doors of cooking ranges and other cabinets, efforts have been directed toward making a handle that is convenient for grasping, attractive in appearance, and of such material that, when used on a cooking range, will not conduct heat to an objectionable degree. Plastic material such as that known as Plaskon and Beetle has been found to be desirable for these purposes. A problem, however, has arisen in connection with the use of such plastics on cooking ranges. Over a period of time a handle of this material undergoes a progressive shrinkage because of successive heating and cooling through intermittent use of the cooking range. During the heating, the plastic material expands, while upon cooling it shrinks not only to its original size but to a point beyond, measurements having shown that a shrinkage of one-eighth of an inch has been effected over a period. Experience has demonstrated that where a handle is rigidly secured to mounting pins or studs fastened to a drawer or door panel, it is apt to crack through the strains imposed by the rigid mounting studs during alternate stages of expansion and shrinkage. It is, therefore, the principal object of my invention to provide a combination floating and rigid mounting for the handle whereby the handle is rigidly secured at its one end and slidably at its other end so that it is free to expand and contract and no strains are imposed thereon.

In shipping cooking ranges or cabinets, it is a common expedient to remove the handles for ease in packing and to prevent damage thereto in the shifting and moving incident to the setting up operation. Consequently, where a handle is mounted on studs secured to a door or drawer and especially where these studs also serve to maintain inner and outer door or drawer panels in assembled relation, it is desirable to provide means for readily mounting a handle on such studs without removing them. It is, therefore, another object of my invention to provide a detachable handle fastening means satisfying the foregoing requirements.

The invention is illustrated in the accompanying drawing, wherein—

Fig. 3 is a horizontal section of a drawer and handle on the line 3—3 of Fig. 1;

Fig. 4 is a longitudinal section of a handle on the line 4—4 of Fig. 2;

Fig. 5 is a section on the line 5—5 of Fig. 6 of a handle and mounting stud in disassembled relation to indicate the mode of connection; and Fig. 6 is a rear elevation of a handle showing in section the studs for fastening the same.

The same reference numerals are applied to corresponding parts throughout the views.

Figure 1:
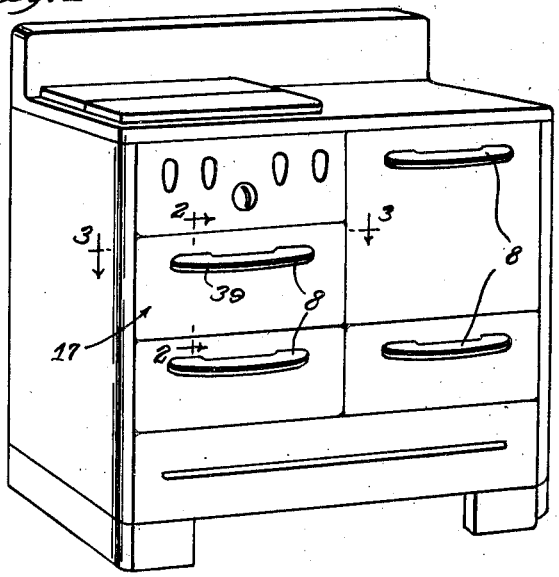
Figure 1 is a perspective view of a cooking range, the doors and drawers of which are equipped with handles made in accordance with my invention.
Figure 2:
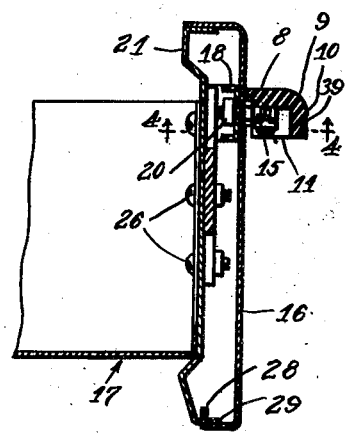
Fig. 2 is a vertical section of a drawer and handle on the line 2—2 of Fig. 1.
Figure 2:
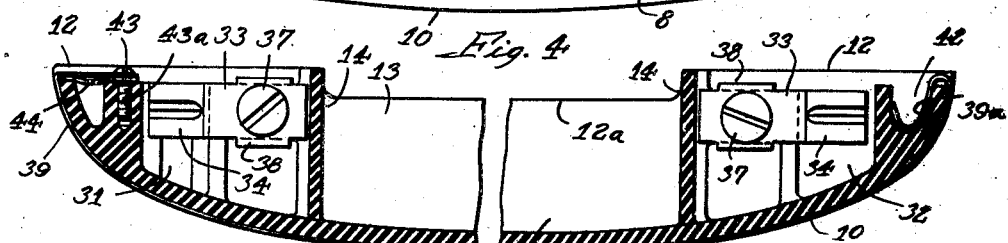

Though the handle is described with especial reference to the cooking range illustrated in Fig. 1 having door constructions as indicated in Figs. 2 and 3, it is evident that this handle may be applied to cabinets generally and other articles of furniture requiring handles.

Each of the handles 8 is molded of a plastic composition material known to the trade as Plaskon or Beetle. Each handle is of elongated form and has a rounded outer top edge 9 and longitudinally arched front surface 10. The bottom surface 11 is flat in a horizontal plane, and the back surface 12 is flat in a vertical plane. The handle is hollowed out as at 13 between parallel ribs 14 at the middle portion of the handle 8 for conveniently grasping it by entering one's finger tips into the bottom, the thumb being pressed against the top or front.

Each handle 8 is arranged to be mounted on studs 15 which project from an outer panel 16 of a door or drawer, as for example in the case of the drawer 17, shown in Figs. 2 and 3. The edge of the top wall of the handle is cut away as at 12a so that, when the handle is mounted, a slot is provided between the back of the handle and the front of the panel 16. This is not only of ornamental value but prevents excessive heating of the handle by thus insulating the middle grip portion of the handle from the range and permitting air to circulate therebetween. As described in a copending application, Serial No. 307,215, filed December 2, 1939, by Grover F. Whitehead, the studs 15 are anchored to the drawer 17 by being secured to a handle supporting bracket 18 of channel construction having cages 19 for nuts 20 which draw shoulders 15a of the studs against the outer panel 16. As is also disclosed in that application, the handle supporting bracket 18 is disposed between the outer panel 16 and an inner panel 21 to secure them in spaced relation, abutting the inner side of the outer panel 16 at its middle portion and projecting inwardly at its end portions where it is secured to T-shaped warp compensating members 22 and 23 by screws 24 and nuts 25. The members 22 and 23 are in turn secured to the inner panel 21 by bolts 26 and are adjustably joined together at their inner ends by a pair of spaced bolts 27 accessible through holes in the inner panel 21 at the middle of the drawer 17, the adjustment of the bolts giving a desired twist to the assembly of the members to offset twist in the panels 16 and 21 and thus straighten the drawer front. As is apparent from Fig. 2, the panels 16 and 21 are maintained in spaced relation at the bottom by lugs 28 on the outer panel flange which enter slots in the flange 29 on the inner panel.

Recesses are provided in the end portions of each handle 8 for the reception of the studs 15. One recess is in the form of a narrow groove 31 of approximately the width of the projecting end of the stud to prevent lateral movement, while the other recess is in the form of a wide channel wherein the other stud may assume any one of a series of positions in laterally spaced relation to one another, depending on the degree of expansion or contraction of the material of the handle. Sheet metal clamps 33 have end portions 34 of V-shaped section which are adapted to enter annular V-shaped grooves 35 in the ends of the studs 15 to fasten the handle detachably. The clamps 33 are secured to ribs 36 molded integral with the handle in transverse relation to the groove 31 and channel 32, screws 37 being entered through holes in the clamps into threaded holes 30 in the ribs to fasten the clamps. Side flanges 38 integral with the clamps 33 overlap the sides of the ribs 36 and prevent swiveling relative to the screws 37. The clamps 33, when the screws 37 are tightened, clamp the studs 15 resiliently in the groove 31 and channel 32. The V-shaped portions 34 of the clamp ride on the outer sides of the V-grooves 35 in the studs so as to cause the handle to be crowded into tight engagement with the panel 16. Provision of the channel 32 in which lateral movement of stud 15 is relatively unconfined permits maximum expansion and contraction of the handle 8 without any danger of breakage from stresses set up in the handle by the studs 15 which are spaced a fixed distance apart. It has been found sufficient to provide space for slidable movement of the stud 15 at only one end of the handle; consequently, the groove 31 at the opposite end prevents relative lateral movement and contributes to the rigidity of the construction. To attach a handle 8, one merely loosens the clamp screws 37 and enters the studs 15 into the groove 31 and channel 32, so that the ends 34 of the clamps 33 enter the grooves 35, in which position the rear side of the handle abuts the outer panel 16. To complete the attaching operation, all that need be done is to tighten the screws 37 thereby tensioning the clamps 33 against the grooved ends of the studs 15. This tension maintains firm attachment of the handle to the drawer 17. To remove the handle all that is required is the loosening of the screws 37, whereupon the handle can be slipped off the studs 15.

An ornamental metal band 39 of arcuate cross-section to give a crown effect on the exterior is set in a groove 40 in the front 10 of the handle, the cross-section also facilitating maintaining it within the groove. One end of the band 39 is, in accordance with the copending application of John F. Hennessy, Serial No. 396,023, filed May 31, 1941, held frictionally by kinking it as at 39a into a recess 42 in the end of the handle, while the opposite end is secured by a screw 43 which threads in a hole 43a in the handle and is entered through a hole in the band. A bent leaf spring 44 is inserted between this end of the band and the handle 8 and has the screw 43 extending through a hole therein. This spring 44 continuously exerts pressure outwardly upon the band 39 so as to take up slack and keep it taut at all times within the groove 40 irrespective of expansion and contraction, and irrespective of shrinkage of the handle in the course of service. As a result the handle always has a neat appearance and the range owner never experiences any difficulty or annoyance with the band coming out of the groove and requiring a repair man to replace it.

It is believed the foregoing description conveys a good understanding of the objects and advantages of my invention. The appended claims have been drawn to cover all legitimate modifications and adaptations.

I claim:

1. A handle adapted for attachment to a suitable support, said handle comprising a one-piece elongated body providing two spaced-apart attaching end portions, each having a vertical surface for abutment with the support, one of said end portions having a shallow elongated groove formed in the bottom thereof substantially normal to the aforesaid vertical surface, adapted to receive with a close fit a stud for mounting the end portion on the support, the other end portion of said handle having a wider elongated groove of substantially the same shallow depth as the first groove in the bottom thereof normal to the aforesaid vertical surface, adapted to receive with a loose fit a stud to mount said end portion on the support, and each of said end portions having adjacent the groove therein an elongated rib extending in transverse relation to the groove and adapted to support a retaining member for cooperation with the stud disposed in the groove.

2. A handle as set forth in claim 1, including an elongated sheet metal clamp member on each of the end portions of said handle disposed in transverse relation to the groove therein, having one end portion formed longitudinally to V-shaped cross-section with the apex of the V projecting toward the groove, the other end portion being formed to channel-shaped cross-section and receiving the rib in the channel thereof to prevent turning of the clamps relative to the ribs, and means for securing said clamps to said ribs.

3. In a detachable handle structure of the character described, a pair of stud members adapted to be fastened to a panel or the like so as to project therefrom in spaced substantially parallel relation, the said stud members having transverse grooves provided in their projecting ends, a handle having a side surface abutting said panel, a smooth top surface and recesses provided on the bottom in opposed end portions thereof for the reception of the projecting ends of the studs, stiff elongated sheet metal clamps adjustably secured to and recessed in the handle on the bottom thereof and having end portions extending transversely relative to said recesses formed to V-shaped cross-section and disposed with the apex of the V engaged in the transverse grooves in said studs to maintain the handle in abutment with the said panel.

4. A structure as set forth in claim 3, in which at least one of the recesses in the handle is of sufficiently greater width than the stud and the end portions of said clamp applies a limited spring tension thereto to permit lateral movement of the handle end portion relative to the stud in a direction lengthwise relative to the V-shaped end portion of the clamp, without disengagement of the clamp from the groove in the stud.

5. In a detachable handle structure of the character described, a pair of stud members adapted to be fastened to a panel or the like so as to project outwardly therefrom in spaced substantially parallel relation, the said studs having transverse V-shaped grooves provided in their projecting ends, a handle having a side surface abutting said panel, a smooth top surface and recesses provided on the bottom in opposed end portions thereof for the reception of the projecting ends of the studs, elongated sheet metal clamps adjustably secured to the handle on the bottom thereof and having V-shaped stiff resilient end portions extending transversely relative to said recesses with the apex of the V engaged in the grooves in said studs to maintain the end portions of the handle in tight abutment with the outer side of said panel, and means accessible from the bottom of the handle for securing said clamps in position in the handle against said studs.

6. A handle for attachment to a sheet metal panel member on a cooking range wherein the handle and the panel have different expansion properties, said handle comprising a one-piece elongated body of plastic material providing two spaced apart attaching end portions for abutment with the sheet metal panel member along one side of the handle, rigid supporting studs on said sheet metal panel member engageable with said end portions, one of said end portions having a recess for reception of one of said studs, a retaining member cooperable with said recess for fixedly retaining the last mentioned stud in said recess for rigid support of said one end portion on the panel member substantially prohibiting endwise or other movement of the handle relative thereto, the other end portion having a recess extending longitudinally of the handle a distance substantially greater than the diameter of the other of said studs for reception of said other stud, and a second retaining member clamping said other stud against the bottom of the recess of said other end portion to permit movement of said other stud along the bottom thereof and with respect to said second retaining member upon difference in expansion between said handle and said panel, each of said studs having a slot disposed longitudinally of said handle and each of said retaining members having a V-shaped groove for reception in said slots to urge the handle tightly against said panel and prevent separation of the handle therefrom.

HAROLD H. RING.